United States Patent [19]
Statt

[11] Patent Number: 5,221,921
[45] Date of Patent: Jun. 22, 1993

[54] HIGH SPEED CHARACTER GENERATOR

[75] Inventor: David J. Statt, Rochester, N.Y.

[73] Assignee: Eastman Kodak Company, Rochester, N.Y.

[21] Appl. No.: 794,843

[22] Filed: Nov. 21, 1991

Related U.S. Application Data

[63] Continuation of Ser. No. 430,542, Nov. 2, 1989, abandoned.

[51] Int. Cl.[5] .............................................. G09G 1/06
[52] U.S. Cl. ...................................... 340/735; 340/731
[58] Field of Search ............... 340/750, 747, 731, 735, 340/749, 790, 728; 400/121; 364/523; 395/150, 151

[56] References Cited

U.S. PATENT DOCUMENTS

| | | | |
|---|---|---|---|
| 4,283,724 | 8/1981 | Edwards | 340/731 |
| 4,476,464 | 10/1984 | Hobbs | 340/731 |
| 4,628,305 | 12/1986 | Ikeda | 340/703 |

FOREIGN PATENT DOCUMENTS 0041051  3/1984  Japan ................................. 340/735

Primary Examiner—Alvin E. Oberley
Assistant Examiner—Chanh Nguyen
Attorney, Agent, or Firm—Edward Dugas

[57] ABSTRACT

In a high speed character generator of the type employing reduced font characters, the improvement wherein font parameters are contained in a random access memory that is addressed by a master processor and supplies the font parameters directly to a bit map character generator, that is, the font parameters bypass the master processor.

8 Claims, 3 Drawing Sheets

HIGH SPEED CHARACTER GENERATOR

This application is a continuation of application Ser. No. 07/430,542, filed Nov. 2, 1989, now abandoned.

TECHNICAL FIELD

This invention relates to all points addressable printers and, more particularly, to a bit map character generator for generating the printing signals that are supplied to a marking engine in such a printer.

BACKGROUND ART

U.S. Pat. No. 4,079,458 issued Mar. 14, 1978 to Rider et al discloses a bit map character generator in which character bit maps are stored in a reduced format to save memory space in a character font memory. FIGS. 2 and 3 show typical bit maps of a letter "A" in both normal portrait and normal landscape mode respectively. The traditional em square storage format is indicated by solid line 10, compared with a reduced storage format indicated by dashed line 12 of the type described in the Rider et al patent. Each bit within the character is represented in memory as a 1, and each bit outside the character within the rectangular boundary of the character is represented as a zero. As can be seen in FIGS. 2 and 3, the storage requirements for the characters can be considerably reduced by eliminating surrounding areas that would consist only of zeros. However, in reducing the format in this way, some information such as the location of the character baseline, the space between characters, and the number of words (a word is a group of 16 bits) in the bit map character representation have been lost. It is necessary to supply this information to a bit map character generator that employs the reduced format fonts. FIG. 4 is a simplified block diagram of a prior art character generator of the type shown in U.S. Pat. No. 4,079,458 employing the reduced format bit map fonts. The character generator includes a master processor 20 that receives print commands from an input device (not shown), such as a personal computer. The master processor 20 typically comprises a programmed microprocessor. A look-up table 22 contains font parameters such a character height, width, and font address, and font statistics such as the character alignment ($\Delta x$, $\Delta y$). $\Delta x$, $\Delta y$ define the alignment of the lower left corner of the reduced format bit map with respect to the baseline location of where the character should be placed. The master processor 20 retrieves the character parameters and statistics from the look-up table 22 by addressing the look-up table with a character identifier (ID) such as ASCII code. The master processor 20 computes the x, y page location for the character, using the character statistics, and sends the height, width, font address, and the x, y page location of the character to a bit map character generator 24. The bit map character generator 24 employs the font address and the character height and width, to retrieve the character bit map from a font memory 26 and sends the bit map to a buffer memory 27 and from there to a marking engine (not shown). The buffer memory 27 may comprise a line or page buffer, depending on the design of the character generator.

Since the master processor 20 is a programmed microprocessor, each font parameter look-up takes a separate sequence of machine instructions, which consume processor time and limit the speed of character generation. It is therefore the object of the present invention to provide an improved character generator of the type employing a reduced font.

SUMMARY OF THE INVENTION

The object is achieved according to the present invention by providing a memory containing width, height and font address data for each character to be generated by the character generator. The random access memory is addressed by the master processor with a character identifier code, and in response directly supplies the character width, height and font address information to the bit map character generator, thereby increasing the overall speed of character generation.

In a preferred embodiment of the present invention, a separate random access memory is provided for width, height and font address data, and the memories are addressed in parallel with the character identifier. The font memory associated with the bit map character generator contains a plurality of fonts, and the font address information is generated by combining a font selection code with a standard character code such as ASCII to produce a composite character identifier which become the address applied to the random access memories. The random access memories are dual ported so that their contents can be altered by the master processor to accommodate new fonts.

MODES FOR CARRYING OUT THE INVENTION

Figures 1, 4:
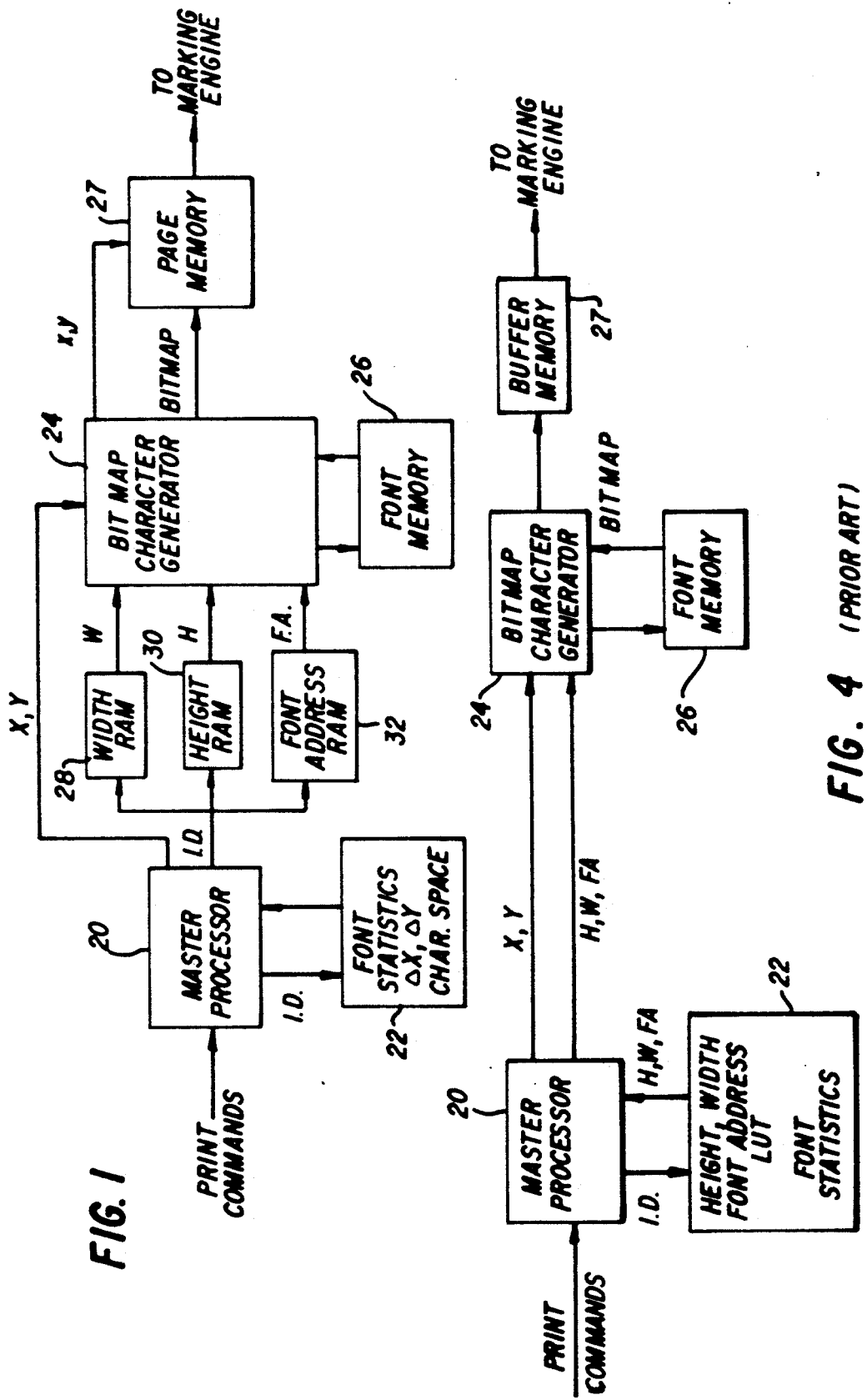
FIG. 1 is a schematic diagram showing a bit map character generator according to the present invention.
FIG. 4 is a schematic diagram illustrating a bit map character generator representative of the prior art.
Figure 2:
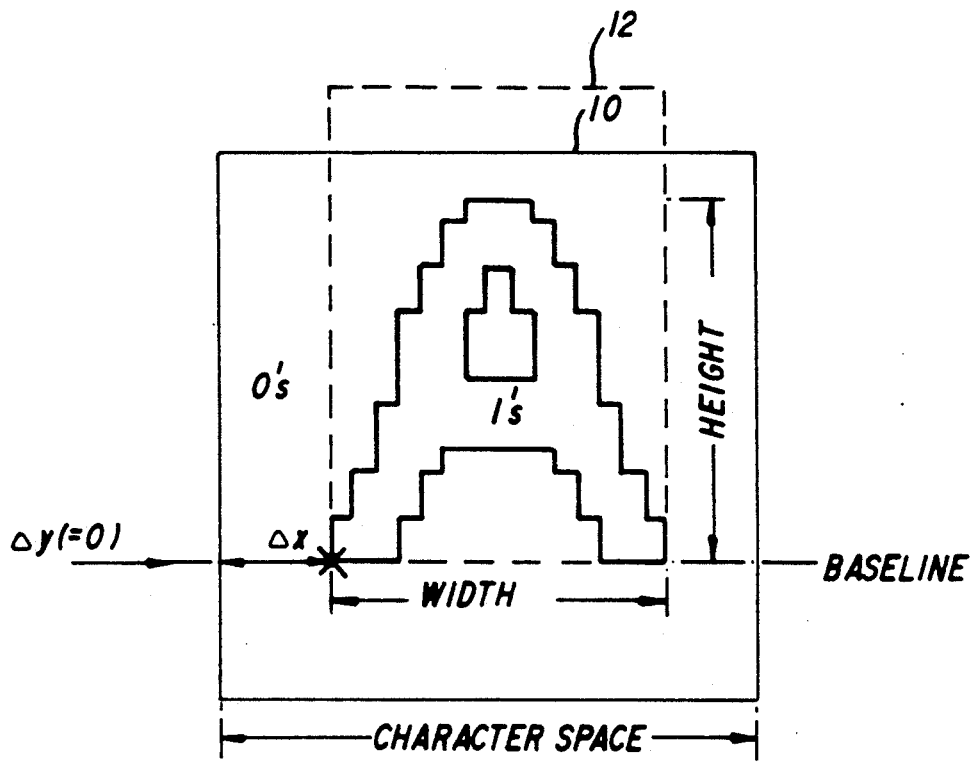
FIG. 2 is a diagram comparing a traditional em square font with the reduced font employed by the present invention in the normal portrait mode.
Figure 3:
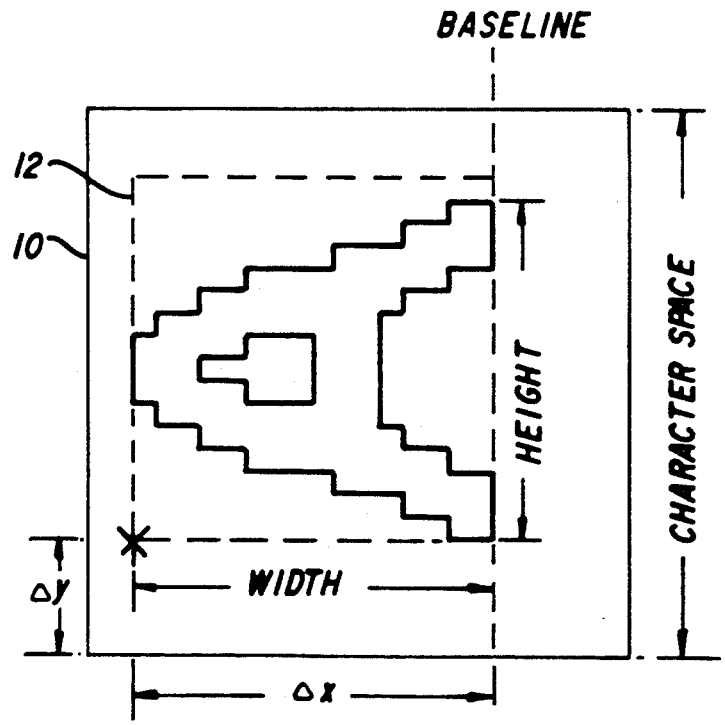
FIG. 3 is a diagram comparing a traditional em square font with the reduced font in the landscape mode.

Referring to FIG. 1, a character generator according to the present invention is shown, where elements similar to those in FIG. 4 are similarly numbered. The look-up table 22 associated with the master processor 20 contains only the font statistics $\Delta x$, $\Delta y$, and character space employed in calculating the x,y location where the reduced storage bit map should be printed and which are sent to the bit map character generator 24. The x,y character locations are calculated by the master processor 20 as follows:

$x = X + \Delta x$; and
$y = Y + \Delta y$, where X is the location for each character along a line expressed in pixels, and each new X is calculated from the preceding X In portrait orientation $X_{new} = X_{previous} +$ character spacing; and Y is the location of the baseline of each character expressed in pixels, and is determined by the desired spacing between lines (e.g. single, one and half, double, etc). In other orientations X and Y increment differently since X and Y are referenced to the paper.

The font parameters required by the bit map character generator 24 are provided by random access memories (RAM) 28, 30, and 32 which contain the character width W (in bits), character height (H in words), and the character starting address (FA) in the font memory 26 respectively. The RAMs 28, 30 and 32 are simultaneously addressed by the master processor 20 with a character identifier (ID). The outputs of RAMs 28, 30 and 32 are supplied directly to the bit map character generator 24 (that is, bypassing the master process), along with the x,y character location information calculated as described above.

Upon receiving the font parameters, the bit map character generator 24 retrieves the first word of the character stored in the font memory 26 at the location FA, and sends the word to page memory at location x,y.

Next, bit map character generator 24 retrieves the word of the character at location FA+1 in the font memory and sends it to location x+16,y in the page memory. The bit map character generator continues in this manner sending the bit map word from font memory location FA+N to location x+16N,y in page memory until N=H the character height. If the width W of the character is only one line, the character generation is complete. If the width W is greater than 1, the bit map character generator sends the next word at location FA+H+1 in the bit map memory to location x+1,y the page memory. The next word at FA+W+2 is sent to x+1,y+16, and so on until the second column of words in the bit map have been sent. The bit map character generator 24 continues in this fashion until the entire character has been sent to page memory. The master processor 20 then sends the next character ID to the parameter RAMs 28, 30 and 32 to generate the next character in the image.

In a preferred embodiment of the present invention, several character fonts are stored in font memory 26. A font identification code is combined with a character identification code and the combined identifier is applied to the width, height and font address RAMs 28, 30 and 32. For example, a seven bit ASCII character identifier is combined with a six bit font identifier to form a thirteen bit ID that is applied to the RAMs. Since the font identifier is changed relatively infrequently with respect to the character identifier, the font identifier is generated once by the master processor 20 and stored in a latch until changed. Provision is also made for switching between the seven bit ASCII character identifier commonly employed in the U.S., and the eight bit extended ASCII character identifier commonly employed in Europe. In the case of the eight bit ASCII character identifier, only five bits are employed in the font identifier code.

Figure 5:
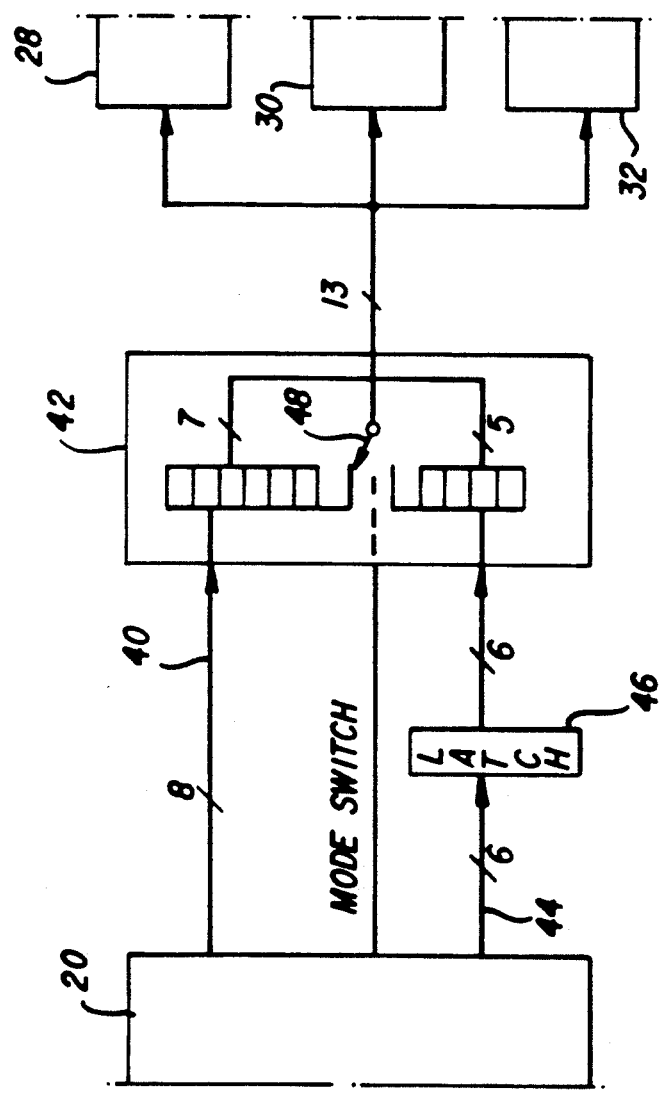
FIG. 5 is a schematic diagram illustrating the apparatus for switching between font modes according to the present invention.

FIG. 5 is a schematic diagram illustrating the apparatus for latching the font identifier and switching between the seven bit ASCII mode and the eight bit ASCII mode. An eight bit character identifier signal is supplied from the master processor 20 on lines 40 to a bit combiner 42. In the eight bit extended ASCII mode, all eight bits are used. In the seven bit ASCII mode, only the first seven bits are used. A six bit font identifier is supplied on line 44 to a latch 46. All six bits of the font identifier may be employed with the seven bit ASCII code, but only five bits of the font identifier are employed with the eight bit extended ASCII code. A mode switch 48 controlled by the master processor 20 is switchable between the eighth bit of the character identifier code and the sixth bit of the font identifier code. The mode switch is employed to select the appropriate character and font identifier bits depending on the type of fonts stored in the font memory 26.

In the preferred mode of practicing the invention, the RAMs 28, 30 and 32 and the font memory 26 are dual ported to the master processor 20 so that new fonts can be easily loaded into the memory.

While the description of font bit maps and the definition of x,y page location have been described with reference to a portrait mode, the present invention is equally useful with other character orientations, such as landscape mode.

Industrial Applicability and Advantages

The character generator according to the present invention is useful in an all points addressable printer and is advantageous in that characters can be rapidly generated for higher printing speeds.

I claim:

1. Apparatus for generating a bit map representation of information to be printed by an all points addressable printer, comprising:
   a. buffer memory means for storing the bit map representation of information to be printed;
   b. font memory means for storing bit map representations of character fonts in a reduced format;
   c. font statistics memory means for storing $\Delta x$, $\Delta y$, and character space statistics for the reduced format character fonts;
   d. font parameter memory means for storing character width, height, and font address parameters for the reduced format character fonts, the font parameter memory means being responsive to a specific character I.D. to produce width, height, and a font address for the specified character;
   e. master processor means connected to the font statistics memory and the font parameter memory, and responsive to a print instruction for retrieving font statistics from the font statistics memory means, and generating an x,y character location, and for sending a specific character I.D. to the font parameter memory means;
   f. bit map character generating means connected to the master processor means, the buffer memory means, the font parameter memory means, and the font memory means, and responsive to the x,y character location from the master processor means, the width, height, and font address from the font parameter memory, for retrieving a character bit map from the font memory and placing the retrieved bit map in the buffer memory at the x,y character location; and
   wherein the font parameter memory means comprises three random access memories (RAMs) simultaneously addressable with the character I.D. and respectively containing width, height and font address information.

2. the apparatus claimed in claim 1, wherein the font memory means contains a plurality of fonts, and including combining means for combining a character identifier code with a font identifier code to produce the specific character I.D. employed to address the font parameter memory means.

3. The apparatus claimed in claim 1, wherein the character ID code can be either a seven bit or an eight bit code, and the font identifier code can be a five bit or six bit code respectively, and said means for combining includes switching means for switching between an eight bit character identifier code combined with a five bit font identifier code and a seven bit character identifier code combined with a six bit font identifier code.

4. An apparatus as claimed in claim 1, wherein said font parameter memory means are provided between said master processor means and said bit map character generating means.

5. The apparatus claimed in claim 1, further comprising:
  character identification data lines connected between said master processor means and said font parameter memory means, said data lines comprising a first group, a second group and a switchable line, the first group carrying a character identification code, the second group carrying a font identification code, and the switchable line switchably carrying a bit of the character identification code or a bit of the font identification code; and
  switching means, coupled to said master processing means and the switchable line, for switching the switchable line between carrying the bit of the character identification code and the bit of the font identification code.

6. The apparatus claimed in claim 5, wherein said master processor means updates the font identification code asynchronously and independently of the character identification code, and further comprising latching means connected between said master processor means and said switching means for latching the font identification code until updated by said master processor means.

7. The apparatus as claimed in claim 6, wherein said character generating means, responsive to updates of the character identification code, retrieves the character bit map from said font memory means using the width, height and font address provided by said font parameter memory means and places the bit map in said buffer memory at the x,y character location.

8. Apparatus for generating a bit map representation of information to be printed by an all points addressable printer, comprising:

a. buffer memory means for storing the bit map representation of information to be printed;
  b. font memory means for storing bit map representations of character fonts in a reduced format;
  c. font statistics memory means for storing $\Delta x$, $\Delta y$, and character space statistics for the reduced format character fonts;
  d. font parameter memory means for storing character width, height, and font address parameters for the reduced format character fonts, the font parameter memory means being responsive to a specific character I.D. to produce width, height, and a font address for the specified character;
  e. master processor means connected to the font statistics memory and the font parameter memory, and responsive to a print instruction for retrieving font statistics from the font statistics memory means, and generating and x,y character location, and for sending a specific character I.D. to the font parameter memory means;
  f. bit map character generating means connected to the master processor means, the buffer memory means, the font parameter memory means, and the font memory means, and responsive to the x,y character location from the master processor means, the width, height, and font address from the font parameter memory, for retrieving a character bit map from the font memory and placing the retrieved bit map in the buffer memory at the x,y character location;
wherein the font parameter memory means comprises three random access memories (RAMs) simultaneously addressable with the character I.D. and respectively containing width, height and font address information; and
wherein the RAMs are dual ported to enable the update of their contents by the master processor means.

* * * * *